United States Patent [19]
Watanabe et al.

[11] Patent Number: 5,512,950
[45] Date of Patent: Apr. 30, 1996

[54] SOLID STATE IMAGER DEVICE AND DRIVING METHOD THEREOF

[75] Inventors: Takashi Watanabe, Soraku; Akihira Tokuno, Higashiosaka, both of Japan

[73] Assignee: Sharp Kabushiki Kaisha, Osaka, Japan

[21] Appl. No.: 288,462

[22] Filed: Aug. 10, 1994

[30] Foreign Application Priority Data

Oct. 8, 1993 [JP] Japan .................................. 5-252801
Mar. 17, 1994 [JP] Japan .................................. 6-047405

[51] Int. Cl.⁶ ...................................................... H04N 5/335
[52] U.S. Cl. ........................... 348/297; 348/296; 348/298
[58] Field of Search ..................................... 348/362, 296, 348/364, 297, 298, 299; H04N 5/335

[56] References Cited

U.S. PATENT DOCUMENTS

| 4,875,100 | 10/1989 | Yonemoto et al. | 348/296 |
| 5,157,502 | 10/1992 | Nakajima et al. | 348/296 |

FOREIGN PATENT DOCUMENTS

| 63-105579 | 5/1988 | Japan | H04N 5/335 |
| 63-158981 | 7/1988 | Japan | H04N 5/335 |
| 4-32380 | 2/1992 | Japan | H04N 5/335 |
| 5-48978 | 2/1993 | Japan | H04N 5/335 |

OTHER PUBLICATIONS

K. Ishikawa et al., "IT CCD Imaging Sensor with Variable Speed Electronic Shutter", *SPIE*, vol. 1107 Infrared Detectors, Focal Plane Arrays, and Imaging Sensors, 1989, pp. 66–76.

M. Hamasaki et al., "Television Society Technical Report", *TBES*, vol. 12, No. 12, (Feb. 1988), pp. 31–36.

*Primary Examiner*—Wendy R. Greening
*Assistant Examiner*—Andrew B. Christensen
*Attorney, Agent, or Firm*—David G. Conlin; Kevin J. Fournier

[57] ABSTRACT

An object of the invention is to provide a solid state imager device in which an electronic shutter function is provided and charges never overflow a light receiving portion even when the light with a high intensity enters thereinto and to provide the driving method thereof. In the solid state imager device and the driving method, an electronic shutter operation is conducted by sweeping out the charges in the light receiving portion by applying a predetermined voltage to a substrate, and the voltage application period is within a horizontal blanking period when an effective exposure period of the electronic shutter exceeds a vertical blanking period and the voltage application period covers an effective horizontal scanning period when the effective exposure period is within the vertical blanking period.

5 Claims, 7 Drawing Sheets

Fig.6(a) VERTICAL SYNCHRONIZATION
PRIOR ART

Fig.6(b) READOUT PULSE
PRIOR ART

Fig.6(c) SHUTTER PULSE
PRIOR ART

Fig.6(d) OUTPUT IMAGE PLANE
PRIOR ART

Fig.7(a) VERTICAL SYNCHRONIZATION PRIOR ART

Fig.7(b) READOUT PULSE PRIOR ART

Fig.7(c) SHUTTER PULSE ① PRIOR ART

Fig.7(d) SHUTTER PULSE ② PRIOR ART

Fig.7(e) SIGNAL VOLUME ① PRIOR ART

Fig.7(f) SIGNAL VOLUME ② PRIOR ART

SOLID STATE IMAGER DEVICE AND DRIVING METHOD THEREOF

BACKGROUND OF THE INVENTION

1. Field of the Invention

The present invention relates to a solid state imager device having an electronic shutter function and a driving method thereof.

2. Description of the Related Art

There has been proposed various methods for operating an electronic shutter in a two-dimensional imaging sensor employing a charge coupled device (CCD) or the like to electrically control an exposure time without a mechanical shutter. Recently, to use a substrate arranged on a lower side of a light receiving portion as a drain and sweep out electric charges accumulated for a non-exposure period into the substrate has been a dominant method for controlling the exposure time in the art. (See "Television society technical report" TBES' 88-6: February 1988).

Figure 5A:
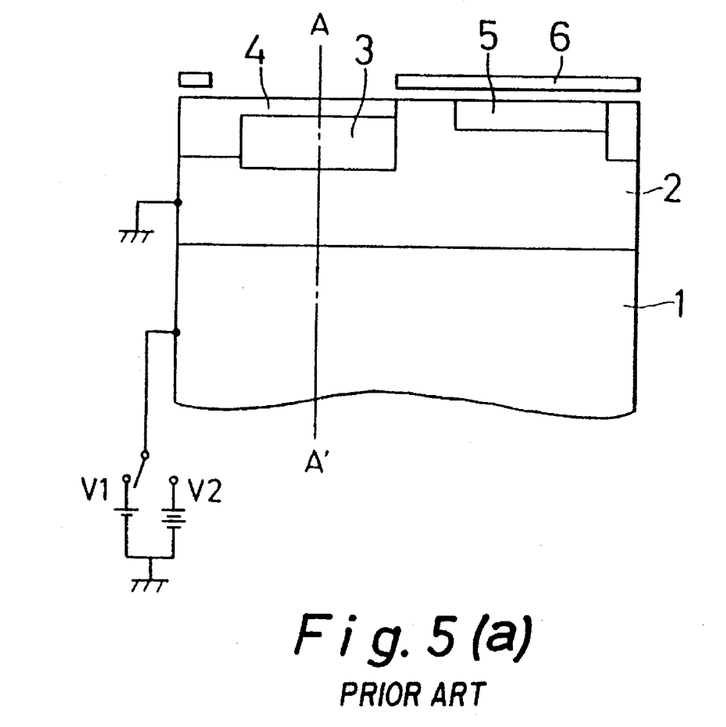
FIG. 5(a) is a sectional view showing a light receiving portion including its vicinity of an embodiment of a solid state imager device to which the invention can be applied.
Figure 5B:
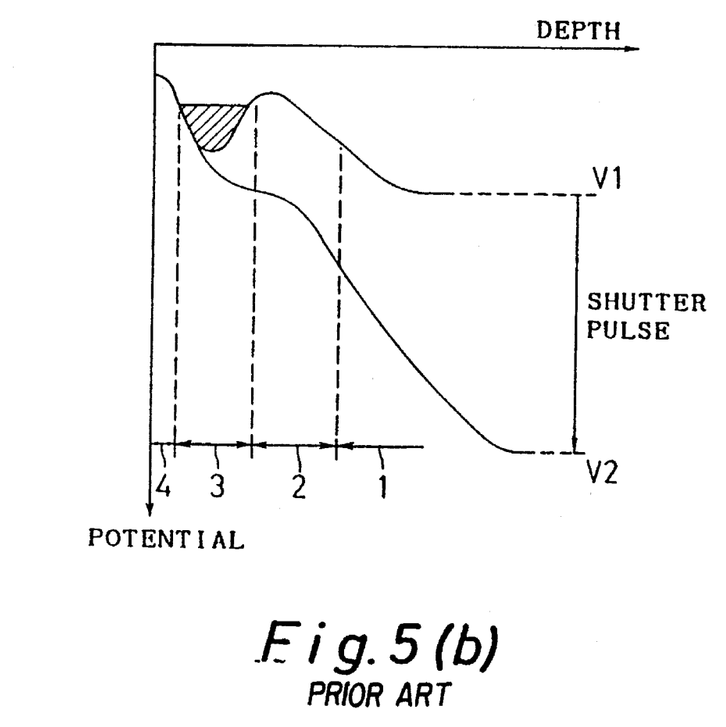
FIG. 5(b) is a potential profile along line A—A' in FIG. 5(a).

FIG. 5(a) is a sectional view showing a light receiving portion and its vicinity of an example of a solid state imager device to which the present invention can be applied. FIG. 5(b) is a potential profile along line A—A' in FIG. 5(a). The solid state imager device comprises a P-type well. 2 formed on a N-type substrate 1, a N-type layer 3 of a light receiving portion and a transfer portion 5 formed on the P-type well 2, a high density $P^+$-type layer 4 formed on a surface side of the N-type layer 3, and an electrode 6 of polysilicon or the like formed above the transfer portion 5 as shown in FIG. 5(a). The P-type well 2 is electrically grounded, and there is provided with a voltage application circuit which selectively applies a relatively low voltage $V_1$ of about 5 V or a sufficiently high voltage $V_2$ of about 30 V to the N-type substrate 1 in correspondence with an external signal.

As shown in FIG. 5(b), signal charges are accumulated in the N-type layer 3 of the light receiving portion in such a state that the lower voltage $V_1$ is applied to the N-type substrate 1, because a potential barrier is formed in the vicinity of the interface between the P-type well 2 and the N-type layer 3 (hatched portion shown in FIG. 5(b)).

On the other hand, when the higher voltage $V_2$ is applied to the N-type substrate 1, the potential barrier is extinguished and all the signal charges accumulated in the light receiving portion of the N-type layer are swept out into the N-type substrate 1. Thus, to the control the voltage applied to the N-type substrate 1 enables a shutter operation that charges are not accumulated except for a desired period. Consequently, the exposure period for the shutter operation ranges from the point of time when the voltage applied to the N-type substrate has been changed from $V_2$ to $V_1$ to the point of time when the signal charges accumulated in the light receiving portion are readout in the transfer portion.

Figure 6A:
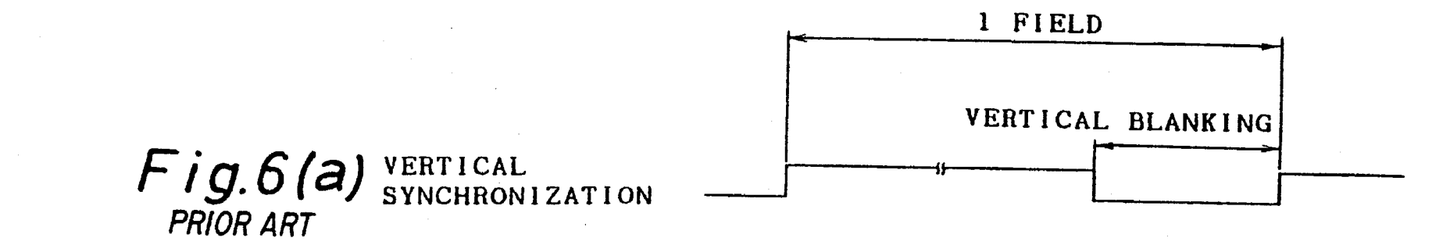
FIGS. 6(a)–(c) are timing charts of signals showing an example of a conventional driving method and FIG. 6(d) is a schematic illustration of an output image plane.
Figures 6B, 6C, 6D:
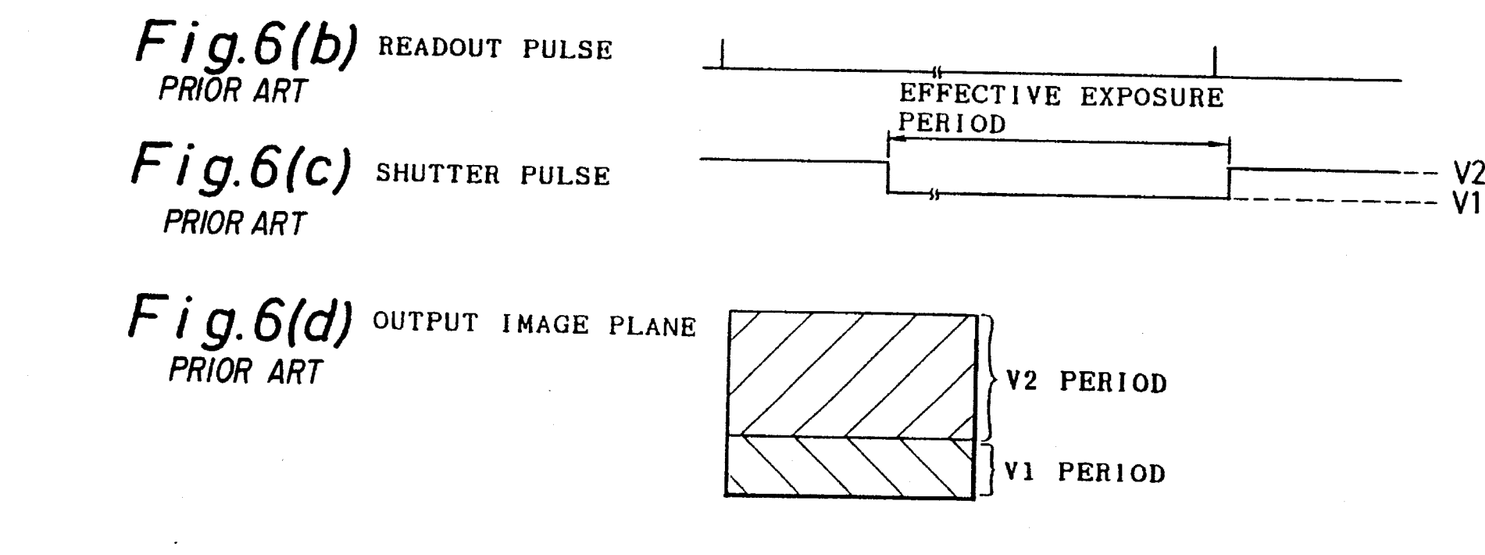

FIGS. 6(a)–(c) are timing charts of signals in the case where the above-described shutter operation is simply realized. FIG. 6(a) is a vertical synchronization timing chart in which a one cycle is one field period consisting of an effective vertical scanning period and a vertical blanking period. As shown in FIG. 6(b), a readout pulse is generated in the latter half of the vertical blanking period in order to activate the readout operation of the charges accumulated in the light receiving portion. In a shutter pulse shown in FIG. 6(c), the voltage applied to the N-type substrate 1 is predetermined to the lower voltage $V_1$ in the effective exposure period ranging from the beginning of receiving light to the generation of the readout pulse and to the higher voltage $V_2$ in the ineffective exposure period.

However, a voltage variation of the shutter pulse is 25 V in the method shown in FIG. 6, which is considerably high in comparison with an average image signal of 300 mVp-p. Accordingly, since the signal ground voltage of the solid state imager device varies due to such a high voltage variation, signal level variation occurs nearly in the variation point of the shutter pulse when the variation point is within an image signal period. As a result of the signal level variation, horizontal striping occurs on an output image plane due to the variation of luminance brightness as shown in FIG. 6(d).

An example of the shutter operation in which the variation point of the shutter pulse does not undesirably effect on the image is disclosed in the Japanese Unexamined Patent Publication JP-A 63-105579 (1988) and the U.S. Pat. No. 4,875,100. In the example of the shutter operation, the signal level variation in the image signal period is prevented by setting the variation point of the shutter pulse so as to be within the horizontal blanking period.

Figure 7A:
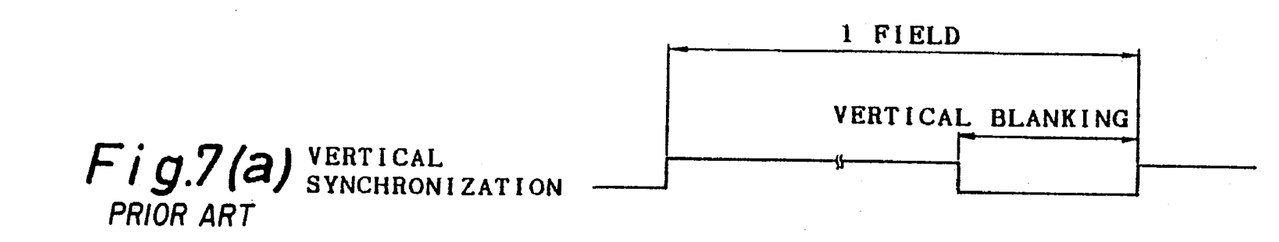
FIGS. 7(a)–(f) are timing charts of signals of another example of the conventional driving method.
Figure 7B:
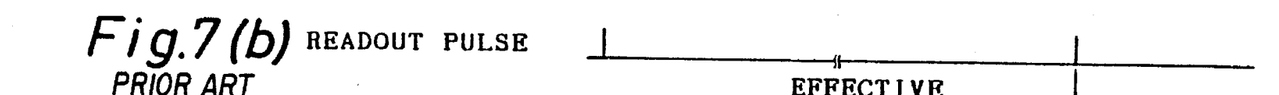

FIGS. 7(a)–(f) are timing charts of the shutter operation where the variation point of the shutter pulse is set to be within the horizontal blanking period. FIG. 7(a) is a timing chart of vertical synchronization where one cycle is considered to be one field period consisting of an effective vertical scanning period and a vertical blanking period (the same as that shown in FIG. 6(a)). A readout pulse is also generated in the latter half of the vertical blanking period in order to activate the readout operation of the charges accumulated in the light receiving portion as shown FIG. 7(b) The predetermination of the effective exposure period from the beginning of receiving light to the generation of the readout pulse is changed in correspondence with the intensity of incident light.

Figure 7C:
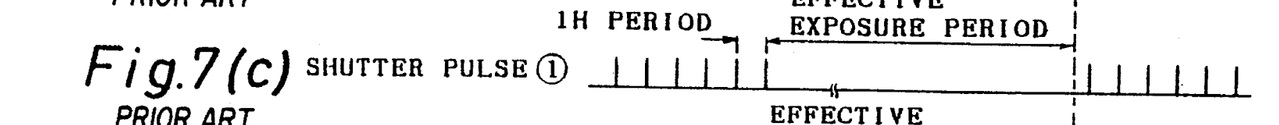

FIG. 7(c) is a timing chart of the shutter pulse in the case where the intensity of light incident to the light receiving portion is low and the effective exposure period from the beginning of receiving light to the generation of the readout pulse is set to be relatively long. The effective exposure period means a period when charges utilized for an image signal are accumulated. In this case, the signal level variation is not caused for an image signal period, because the rising and falling of the shutter pulse are completed within a horizontal blanking period of the horizontal scanning period (1H period) in the ineffective exposure period. The ratio of the horizontal blanking period to one horizontal scanning period amounts to about 17%, for example, in the device complying with National Television System Committee Standard.

Figure 7D:
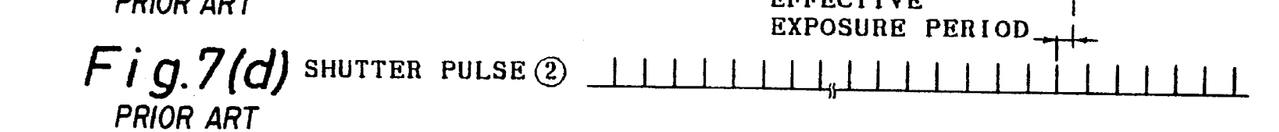

FIG. 7(d) is a timing chart of the shutter pulse in the case where the intensity of light incident to the light receiving portion is high and the effective exposure period is set to be shorter. The signal level variation is not caused for an image signal period, because the rising and falling of the shutter pulse are also completed within the horizontal blanking period in the ineffective exposure period (the same as that shown in FIG. 7(c)).

In the conventional shutter operation described with reference to FIGS. 7(a)–(f), however, as the intensity of the incident light is enhanced, a large-quantity of charges are generated only within a short period of an effective horizontal scanning period. Consequently, the light receiving portion is flooded with the charges and the charges overflow into other light receiving portions therearound or into transfer portions, which causes a so-called blooming phenomenon.

Figure 7E:
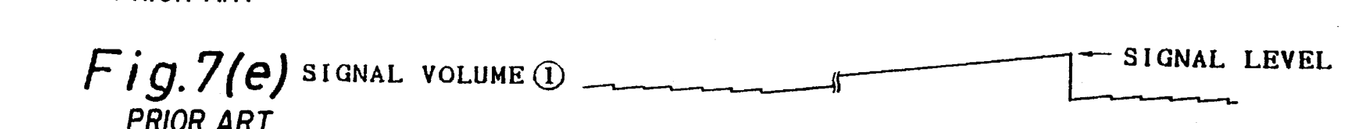

The phenomenon will be described in detail in the following. FIG. 7(e) is a timing chart of the volume of signals accumulated in the light receiving portion in the case where the intensity of incident light is lower and the shutter operation is conducted with the shutter pulse shown in FIG. 7(c). More specifically, the signal volume increases with a gradient proportional to the intensity of the incident light in the effective exposure period ranging from the beginning of receiving light to the generation of the read out pulse, and the signal volume at the time of termination of the effective exposure period is read out as an image signal level. On the other hand, in the ineffective exposure period, the signal volume increases with the same gradient within the effective horizontal scanning period and each time the signal volume is cleared to be zero by means of the shutter pulse generated in each horizontal blanking period.

Figure 7F:
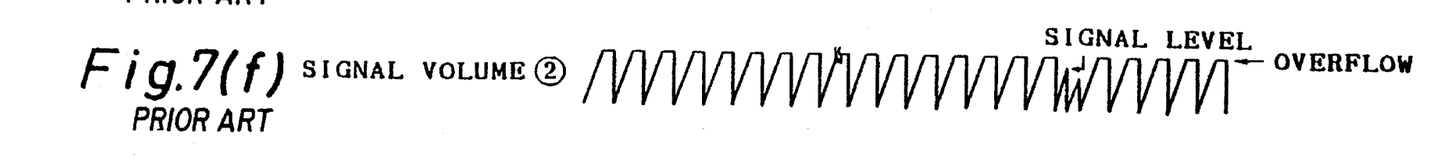

FIG. 7(f) is a timing chart of the volume of signals accumulated in the light receiving portion in the case where the intensity of incident light is higher and the shutter operation is carried out with the shutter pulse shown in FIG. 7(d). In this case, the signal volume increases with a gradient proportional to the intensity of the incident light in the effective exposure period and the signal volume at the time of the termination of the effective exposure period is read out as an image signal level. On the other hand, though the signal volume increases with the same gradient in the effective horizontal scanning period of the ineffective exposure period, the signal volume is saturated at a certain level, because most of charges generated in the light receiving portion overflow the potential barrier into the other light receiving portions therearound or transfer portions.

It is required in the electronic shutter operation to obtain a normal image by controlling the exposure period even in the case of an extremely high intensity of incident light. A period for sweeping out the charges into the substrate, however, is limited to a shorter period within a one horizontal scanning period (1H) (the shorter period is, for instance, about one fiftieth of 1H) in the shutter pulse method as shown in FIGS. 7(c) and (d), and therefore, as shown in FIG. 7(f), excess charges overflow the light receiving portion, which causes a failure of activating the shutter operation in the ease of the extremely higher intensity of incident light.

SUMMARY OF THE INVENTION

An object of the invention is to provide a solid state imager device which has no undesirable effect on an image and realizes a shutter operation capable of properly controlling an exposure period and a driving method thereof.

The invention provides a driving method of a solid state imager device having a first layer of a second conductivity type formed on a semiconductor substrate of a first conductivity type and a light receiving portion formed on a surface side of the first layer, which comprises controlling an exposure time by applying a predetermined voltage to the semiconductor substrate and sweeping out a signal charge accumulated in the light receiving portion into the semiconductor substrate, wherein, on the assumption that an effective exposure period is a period ranging from last application of the predetermined voltage to the semiconductor substrate to reading out the signal charge accumulated in the light receiving portion, an application period of the predetermined voltage to the semiconductor substrate is within a horizontal blanking period when the effective exposure period is beyond a vertical blanking period and the application period of the predetermined voltage to the semiconductor substrate covers the entire effective horizontal scanning period when the effective exposure period is within the vertical blanking period.

Further, the invention provides a solid state imager device having a first layer of a second conductivity type formed on a semiconductor substrate of a first conductivity type and a light receiving portion formed on a surface side of the first layer, comprising:

voltage application means for applying a predetermined voltage to the semiconductor substrate and sweeping out a signal charge accumulated in the light receiving portion to the semiconductor substrate;

checking means for checking whether an effective exposure period ranging from a last application of the predetermined voltage to the semiconductor substrate to reading out the signal charge accumulated in the light receiving portion exceeds a predetermined reference period; and pulse generation means for controlling the voltage application means by generating a pulse which is within a horizontal blanking period when the effective exposure period is beyond the predetermined reference period or which covers an effective horizontal scanning period when the effective exposure period is within the predetermined reference period.

It is preferable in the invention that the predetermined reference period is within a vertical blanking period.

Still more, it is preferable in the invention that the checking means conducts counting in a unit of horizontal scanning period to measure the effective exposure period.

Finally, the invention provides a solid state imager device having a first layer of a second conductivity type formed on a semiconductor substrate of a first conductivity type and a light receiving portion formed on a surface side of the first layer, comprising:

voltage application means for applying a predetermined voltage to the semiconductor substrate and sweeping out a signal charge accumulated in the light receiving portion to the semiconductor substrate;

setting means for setting an effective exposure period ranging from a last application of the predetermined voltage to the semiconductor substrate to reading out the signal charge accumulated in the light receiving portion;

reference outputting means for outputting a reference value corresponding to a length of photometric period;

integrating means for integrating an electrical signal converted by the light receiving portion every horizontal scanning period;

upper level detecting means for detecting whether an output from the integrating means is beyond a predetermined upper limit;

lower level detecting means for detecting whether the output from the integrating means is below a predetermined lower limit;

counting means on an upper limit side for counting in a unit of horizontal scanning period a time length when the upper level detecting means is outputting a signal representing that the output from the integrating means is beyond the upper limit in the photometric period, and outputting a signal representing a too bright period on the basis of the count;

counting means on a lower limit side for counting in a unit of horizontal scanning period a time length when the lower level detecting means is outputting a signal representing that the output from the integrating means is below the lower limit in the photometric period, and outputting a signal representing a too dark period on the basis of the count;

level checking means for deciding every vertical scanning period whether to increase, decrease, or maintain the effective exposure period set in the setting means on the basis of a reference value outputted from the reference outputting means and respective signals from the counting means on the upper limit side and the counting means on the lower limit side;

decision means for deciding whether the effective exposure period set in the setting means exceeds a vertical blanking period; and pulse generation means for controlling the voltage application means by generating a pulse which is within a horizontal blanking period when the effective exposure period is beyond the vertical blanking period or which covers an effective horizontal scanning period when the effective exposure period is within the vertical blanking period.

According to the invention, the exposure period is not so short to the extent that it is included in the vertical blanking period when a light energy is normal, and therefore the horizontal striping does not occur on an image plane. Further, when the intensity of incident light is high, the exposure period is set to be included in the vertical blanking period and most of the horizontal scanning period is devoted to sweeping out the charges into the substrate. Thus, the function of the shutter operation is enhanced and the overflow of excess charges does not occur in the light receiving portion. Moreover, the exposure is started within the vertical blanking period and therefore the horizontal striping does not occur on an image plane.

According to the invention, when the light energy is within a normal range and the effective exposure period is beyond a predetermined reference period, the signal level variation within the image signal period can be prevented because the voltage application means is controlled by generating a pulse which is included within the horizontal blanking period. On the other hand, when the incident light has a high energy and the effective exposure period is within the predetermined reference period, the voltage application means is controlled by generating a pulse which covers the effective horizontal scanning period. Accordingly, it is made possible to effectively sweep out into the substrate the charges excessively accumulated in the light receiving portion, and thereby the blooming phenomenon is prevented.

Additionally, the predetermined reference period is covered by the vertical blanking periods and thereby the variation point of the pulse exists within the vertical blanking period even when the pulse generated by the pulse generation means is changed over in correspondence with the length of the effective exposure period, and therefore the signal level variation within the image signal period can be avoided.

Further, the effective exposure period is measured by counting in a unit of horizontal scanning period and thereby the checking means with a simple constitution can achieve a highly accurate measurement.

Furthermore, according to the invention, since the shutter speed is controlled on the basis of information in the entire measurement period, that is the entire photometry area, obtained by counting all the too bright periods and the too dark periods by level checking means, the shutter operation can be conducted without being affected even when the photometric area has a localized distribution in brightness.

As described above in detail, the blooming phenomenon is prevented even in the case of the incident light with a high intensity and a proper shutter operation can be achieved. Additionally, a high quality of image signals can be obtained, which have a great practical value, because the signal level variation accompanied with the shutter operation does not on the image plane.

Furthermore, since the effective exposure period can be controlled on each image plane, the shutter speed can be rapidly changed. In addition, the shutter operation can be properly conducted without being affected even when the photometric area has a localized distribution in brightness.

BRIEF DESCRIPTION OF THE DRAWINGS

Other and further objects, features, and advantages of the invention will be more explicit from the following detailed description taken with reference to the drawings wherein:

FIGS. 1(a)–(g) are timing charts of signals of an embodiment of a solid state imager device according to the invention.

DETAILED DESCRIPTION OF THE PREFERRED EMBODIMENT

Now referring to the drawings, preferred embodiments of the invention are described below.

Figures 1A, 1G:
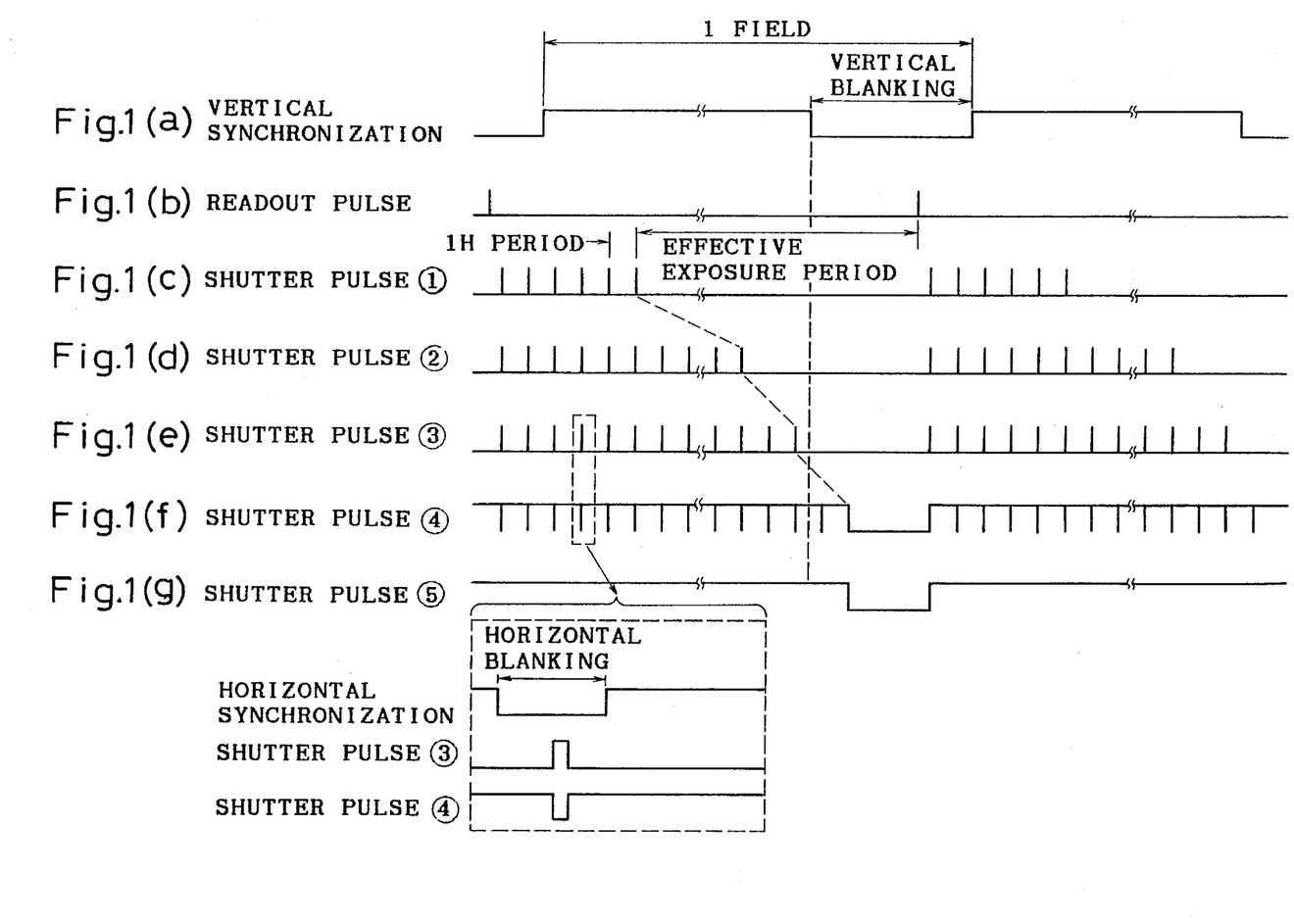

FIGS. 1(a)–(g) are timing charts of signals of an embodiment of a solid state imager device according to the invention. FIG. 1(a) is a timing chart of vertical synchronization where a one field period consisting of an effective vertical scanning period and a vertical blanking period is considered to be a one cycle.

A readout pulse is generated in the latter half of the vertical blanking period in order to activate the readout operation of the charges accumulated in the light receiving portion as shown in FIG. 1(b). FIGS. 1(c)–(f) are timing charts of shutter pulses in the case where the effective exposure period from the beginning of receiving light to the generation of the readout pulse is gradually shortened as the intensity of incident light gradually increases.

FIG. 1(c) is a timing chart of shutter pulses in the case where the effective exposure period is longer and the beginning time of receiving light is covered by the effective vertical scanning period. The voltage applied to the substrate is set for the lower voltage level $V_1$ in the effective exposure period. For the ineffective exposure period, the voltage is, to the contrary, set for the higher voltage level $V_2$ in the horizontal blanking period included in the horizontal scanning period (1H period). Since the rising and falling of the shutter pulse are completed within the horizontal blanking period, the variation of the signal level never occurs within the image signal period.

FIG. 1(d) is a timing chart of the shutter pulse in the case where the effective exposure period is shorter than that shown in FIG. 1(c) and the beginning time of receiving light is included in the effective vertical scanning period. The same as FIG. 1(c), the voltage applied to the substrate is set for the lower voltage level $V_1$ in the effective exposure period, and, to the contrary, for the higher voltage level $V_2$ in the horizontal blanking period included in the ineffective exposure period.

FIG. 1(e) is a timing chart of the shutter pulse in the case where the effective exposure period is shorter than that shown in FIG. 1(d) and the beginning time of receiving light is included in the effective vertical scanning period. The same as that shown in FIG. 1(c), the voltage applied to the substrate is set for the lower voltage level $V_1$ in the effective exposure period, and, to the contrary, for the higher voltage level $V_2$ in the horizontal blanking period included in the ineffective exposure period.

FIG. 1(f) is a timing chart of the shutter pulse in the case where the effective exposure period is shorter than that shown in FIG. 1(e) and the time of the beginning of receiving light is included within the vertical blanking period. The same as that shown in FIG. 1(c), the voltage applied to the substrate is set for the lower voltage level $V_1$ in the effective exposure period. The voltage is, however, in most of the ineffective exposure period, set for the higher voltage level $V_2$ and for the lower voltage level $V_1$ in the horizontal blanking period, because the pulse shape is the reverse of the pulse shape shown in FIG. 1(e) in the ineffective exposure period. Thus, a high capability of sweeping out the charges into the substrate is maintained in the ineffective exposure period by setting the high level period of the shutter pulse to cover the effective horizontal scanning period even when the light with a high intensity enters into the light receiving portion, and therefore the charges are prevented from overflowing the light receiving portion. Moreover, since the rising and falling of the shutter pulse are completed within the horizontal blanking period, the signal level variation does not occur within the image signal period.

FIG. 1(g) is a timing chart of shutter pulses in the case where the effective exposure period is the same as that shown in FIG. 1(f) and the beginning time of receiving light is included within the vertical blanking period. The same as that shown in FIG. 1 (f), the voltage applied to the substrate is set for the lower voltage level $V_1$ in the effective exposure period and for the higher voltage level $V_2$ in the entire ineffective exposure period. Also in this case, the high capability of sweeping out the charges into the substrate is maintained in the ineffective exposure period by setting the high level period of the shutter pulse to cover the effective horizontal scanning period even when the light with a high intensity enters into the light receiving portion, and therefore the charges are prevented from overflowing the light receiving portion. Moreover, since the rising and falling of the shutter pulse are completed within the vertical blanking period, the signal level variation does not occur within the image signal period. Accordingly, the shutter operation shown in FIG. 1(g) has the same function as that shown in FIG. 1(f).

Figure 2:
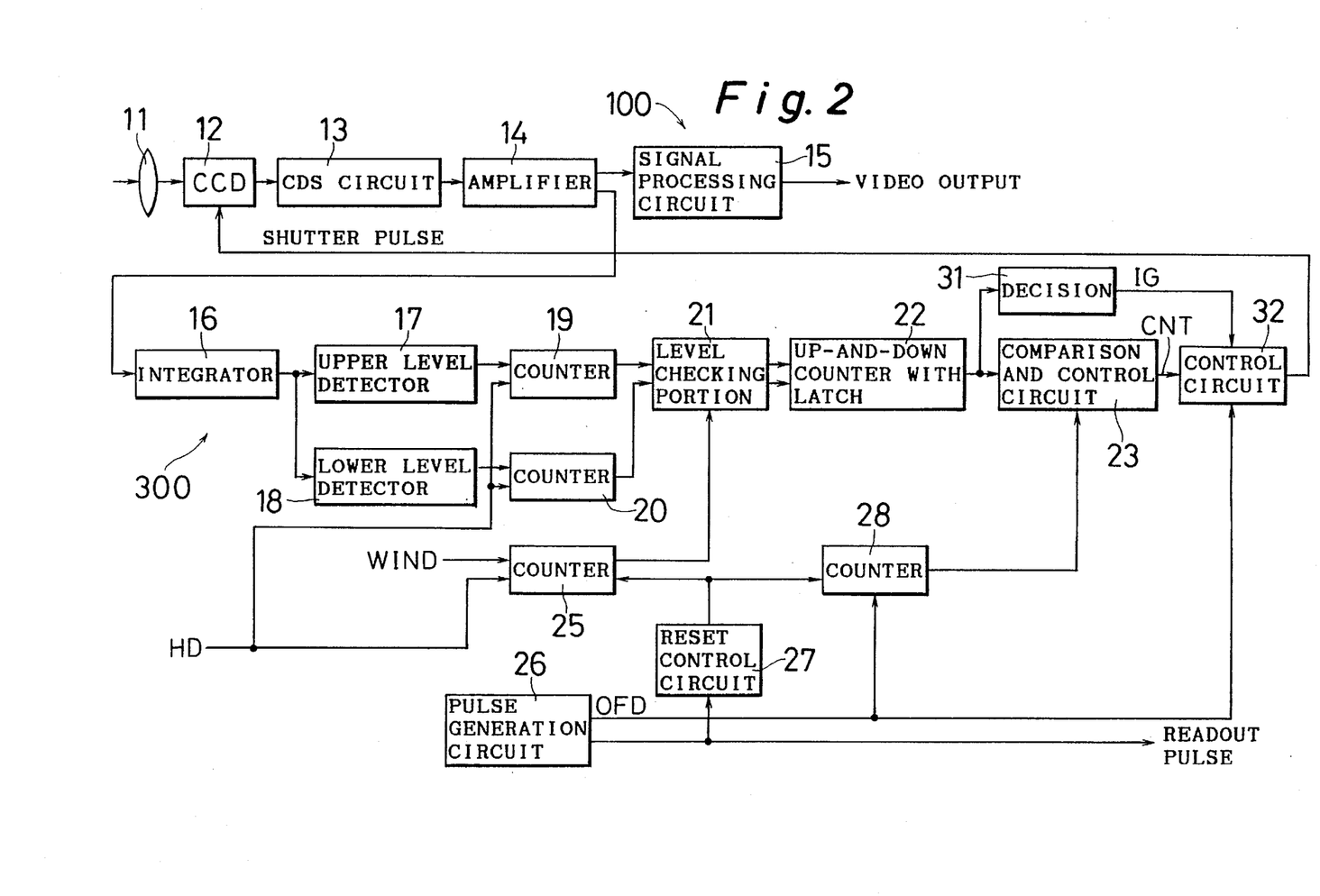
FIG. 2 is a circuit diagram showing an electrical configuration of an embodiment of a solid state imager device according to the invention.

FIG. 2 is a circuit diagram showing an electrical configuration of an embodiment of a solid state imager device according to the invention, and FIGS. 3 (a)–(g) are timing charts of signals for generating a shutter pulse as shown in FIG. 1(f). The solid state imager device comprises an image circuit 100 and an electronic iris control circuit 300. The image circuit 100 comprises a lens 11 for forming light incident from a subject into an image, a CCD 12 where light receiving portions are arranged in a matrix form, a co-related double sampling (CDS) circuit 13 for reducing a 1/f noise by sampling the signals outputted from the CCD 12 two times and conducting a subtraction step, an amplifier 14 for amplifying the signals up to a predetermined level and a signal processing circuit 15 which converts a readout image signal to a television format.

The light incident from the subject through the lens 11 is converted via the CCD 12 in the image circuit 100 to electrical signals, which are inputted into the amplifier 14 after being clamped and sampled-and-held by CDS circuit 13. Thereafter, the electrical signals are amplified up to a proper level via the amplifier 14 so as to be suited to the following signal processing circuit 15. Subsequently, the signals are processed via the signal processing circuit 15 so as to be suited to the television format in order to obtain video outputs.

On the other hand, the signals amplified by the amplifier 14 are inputted into the electronic iris control circuit 300. The electric iris control circuit 300 comprises an integrator 16 for integrating the signals outputted from the amplifier 14, an upper level detector 17 for detecting whether the integrated signal exceeds a predetermined upper limit, a counter 19 for counting a period when the integrated signal exceeded the predetermined upper limit, a lower level detector 18 for detecting whether the integrated signal is below a predetermined lower limit, a counter 20 for counting a period when the integrated signal was below the predetermined lower limit, a counter 25 for outputting a criterion based on a window pulse signal WIND defining a photometric area on a one image plane, a level checking portion 21 for comparing the respective measurements of the counters 19, 20, 25, an up-and-down counter 22 with a latch for conducting an adding and subtracting calculation based on an output from the level checking portion 21, a pulse generating circuit 26 for generating a charge sweeping-out pulse OFD within the horizontal blanking period and a readout pulse within a vertical blanking period, a counter 28 for counting the charge sweeping out pulses OFDs from the time of the readout pulse generation, a reset control circuit 27 for resetting the counters 25, 28 every time of the generation of the readout pulse, comparison and control circuit 23 for comparing between values of the up-and-down counter 22 and the counter 28, a decision circuit 31 for deciding on the basis of the value of the up-and-down counter 22 whether the time of the beginning of receiving light in the effective exposure period is within the vertical blanking period, and a control circuit 32 for generating a shutter pulse by utilizing the charge sweeping out pulses OFDs on the basis of outputs from the comparison and control circuit 23 and the decision circuit 31.

The integrator 16 receives an input from the amplifier 14 of the image circuit 100 every horizontal scanning period, and integrates the received input every horizontal scanning period to output. The upper level detector 17 receives an output from the integrator 16 and detects whether the output exceeds the upper limit. The upper level detector 17 outputs a high level signal when the upper limit is exceeded, and a low level signal when the upper limit is not exceeded. Simultaneously, the lower level detector 18 also receives an output from the integrator 16 and detects whether the output is below the lower limit. The lower level detector 18 outputs a high level signal when the output is below the lower limit and a low level signal when not below that.

The counter 25 receives a window pulse signal WIND corresponding with the photometric area on the image plane and counts the length of a period when the window pulse signal WIND is held high, that is a photometric period, in a unit of horizontal scanning period and a value WH (a reference value) obtained by dividing the result of measuring into two halves is outputted into the level checking portion 21 every vertical scanning period.

When each of the vertical scanning period starts, a count value WC is preset in the counter 19, 20. The count value WC means herein a complement for the reference value WH. Fox example, when one vertical scanning period includes 260 horizontal scanning periods, the count value WC represents (260-WH). The counter 19 counts in a unit of horizontal scanning period all the length of a period when the upper level detector 17 is outputting a high level signal in the photometric period and outputs into the level checking portion 21 a counted value (WC+UH) representing a too bright period in each vertical scanning period based on the counting result UH. On the other hand, the counter 20 counts in a unit of horizontal scanning period all the length of a period when the lower level detector 18 is outputting a high level signal in the photometric period and outputs into the level checking portion 21 a counted value ((WH−DH)+WC) representing a too dark period in each vertical scanning period, based on the counting result DH.

The level checking portion 21 receives the reference value WH from the counter 25 and respective counted values from the counters 19 and 20 every vertical scanning period and decides every vertical scanning period whether to increase, decrease, or maintain the shutter speed. More specifically, when the outputs of the respective counters 19 and 20 are lower than the reference value WH of the counter 25, the shutter speed is considered to be proper and a stop signal is outputted to stop counting of the following up-and-down counter 22. Further, when the output from the counter 19 is lower and the output from the counter 20 higher than the reference value WH, the shutter speed is considered to be too high and a count-down signal is outputted to decrease the shutter speed. To the contrary, when the output from the counter 19 is higher and the output from the counter 20 lower than the reference value WH, the shutter speed is considered to be too low and a count-up signal is outputted to increase the shutter speed.

The up-and-down counter 22, where a counted value 260 (corresponding to the highest shutter speed of 1/15000 sec.) is preset at power-on, receives a count-down signal, count-up signal or stop signal after the lapse of each vertical scanning period to decrease, increase or stop the counting, respectively.

Figure 3A:
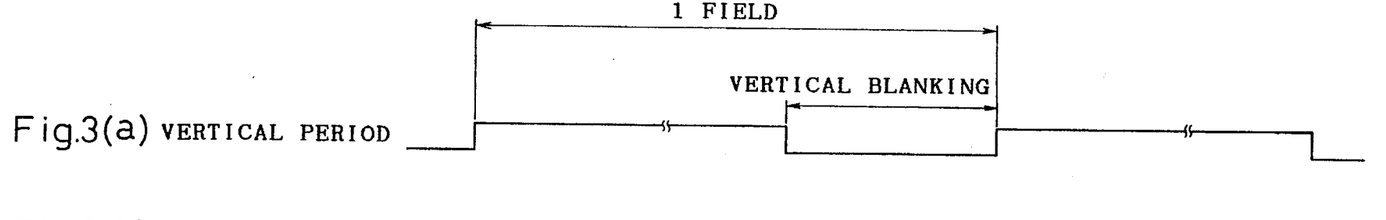
FIGS. 3(a)–(g) are timing charts of signals for generating a shutter pulse as shown in FIG. 1(f).
Figure 3B:
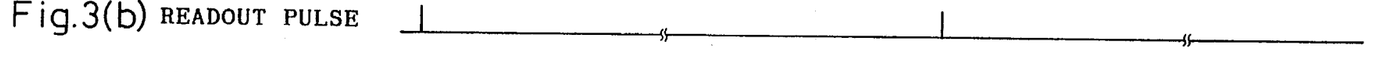
Figure 3C:
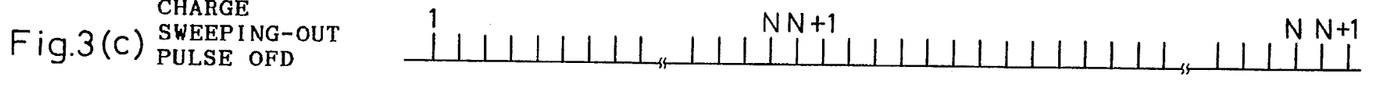

On the other hand, the pulse generating circuit 26 generates the charge sweeping-out pulse OFD (see FIG. 3(c)) within the horizontal blanking period and the readout pulse within the vertical blanking period (see FIG. 3(b)).

The counter 28 counts the number of the charge sweeping out pulses OFDs from the time of the generation of the readout pulse to measure a time elapsed from the time of the readout pulse generation up to the current time in a unit of horizontal scanning period.

Figure 3D:
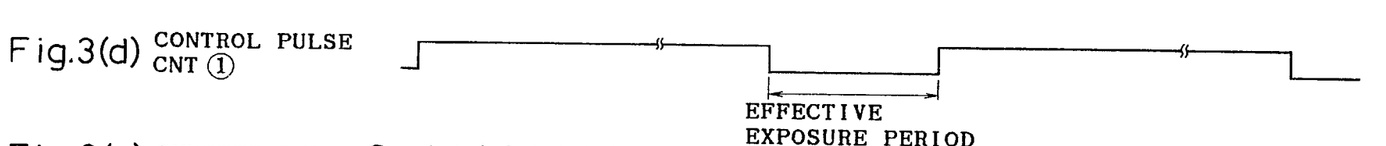

The comparison and control circuit 23 compares the values of the up-and-down counter 22 and the counter 28 and outputs a control pulse CNT (see FIG. 3(d) and (f)), that is a control pulse CNT of high level when the value of the counter 28 is lower than that of the up-and-down counter 22 or a control pulse CNT of low level when the value of the counter 28 is equal to or higher than that of the up-and-down counter 22.

The decision circuit 31 decides on the basis of the value of the up-and-down counter 22 whether the time of the beginning of receiving light of the effective exposure period is within the vertical blanking period, and outputs a decision signal JG of high level or low level into the control circuit 32. The control circuit 32 generates the shutter pulse (see FIG. 3(e), (g)) by utilizing charge sweeping-out pulse OFDs, based on control pulse CNT from the comparison and control circuit 23 and decision signal JG from the decision circuit 31.

The electronic iris control circuit 300 thus regulates the shutter speed with the level checking portion 21 on the basis of information of the entire photometric period, that is the entire photometric area obtained by counting the entire too bright period and the entire too dark period within the photometric period, and thereby the operation is subjected to no effect even when the photometric area has a localized distribution in brightness.

Furthermore, the up-and-down counter 22 has a function latching a counted value ranging from 1 to 260. When the counted value from 1 to 193 is latched, the up-and-down counter 22 decreases or increases the latched count by 9 on once receiving a count-down signal or count-up signal. Similarly, in the case of the latched count from 194 to 241, the up-and-down counter 22 decreases or increases the latched count by 4 on once receiving a count-down signal or count-up signal. In the case of the latched count from 242 to 250, the up-and-down counter 22 decreases or increases the latched count by 1 on once receiving a count-down signal or count-up signal. Thus, while a variation $\Delta t$ is increased in the case of a lower shutter speed, the variation $\Delta t$ can be decreased in the case of a higher shutter speed. Accordingly, logarithmically controlling, which is required by a video camera, for example, can be achieved.

Figure 3E:
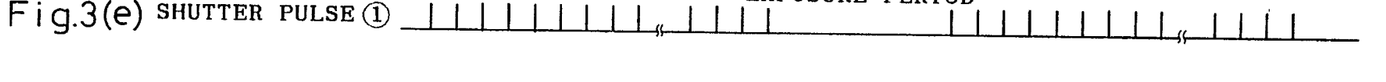
Figure 3F:
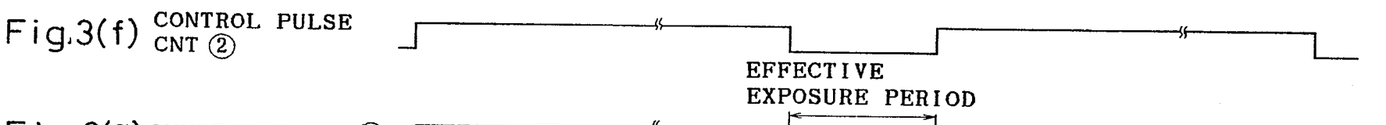
Figure 3G:
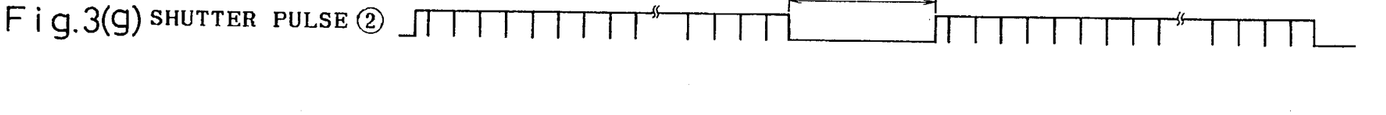

FIG. 3(e) is a timing chart of the shutter pulse when the beginning time of receiving light within the effective exposure period is prior to the vertical blanking period. While the voltage applied to the substrate is preset for the lower voltage level $V_1$ in the effective exposure period like FIG. 1(e), it is preset for the higher voltage level $V_2$ in the horizontal blanking period within the ineffective exposure period.

FIG. 3(g) is a timing chart of the shutter pulse when the beginning time of receiving light is within the vertical blanking period in the effective exposure period. The voltage applied to the substrate is preset for the lower voltage level $V_1$ in the effective exposure period like FIG. 1(f). Since the pulse shape is the inversion of the charge sweeping-out pulse OFD shown in FIG. 3(c) in the ineffective exposure period, the voltage applied to the substrate is preset for the higher voltage level $V_2$ in the most of the ineffective exposure period and is preset for the lower voltage level $V_1$ in the horizontal blanking period. Thus, a high capability of sweeping out the charges into the substrate is maintained within the ineffective exposure period by setting the high level period of the shutter pulse to cover the effective horizontal scanning period even when the light with a high intensity enters into the light receiving portion and therefore the charges therein are prevented from overflowing.

Figure 4:
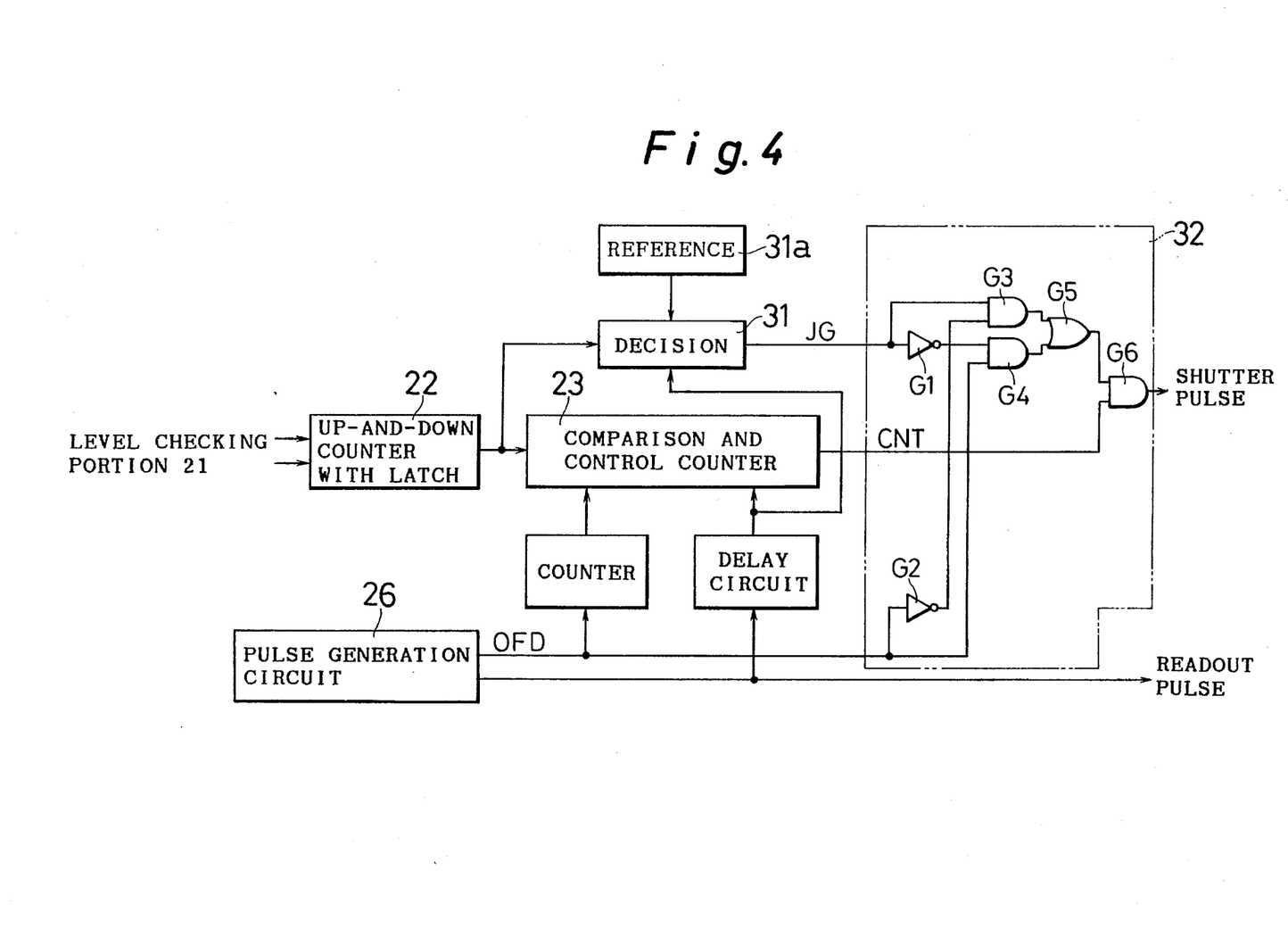
FIG. 4 is a specific examples of a control circuit 32 as shown in FIG. 2.

FIG. 4 is a specific example of a control circuit 32 as shown in FIG. 2. The charge sweeping-out pulse OFD is inputted into an AND-gate G4 of the control circuit 32 and the inverted signal of the charge sweeping-out pulse OFD is inputted through an inverter G2 into an AND-gate G3.

On the other hand, a reference circuit 31a stores reference data corresponding to the starting time of the vertical blanking period within one field period. The decision circuit 31 decides whether the beginning time of receiving light in the effective exposure period is covered within the vertical blanking period by comparing the value of the up-and-down counter 22 and the reference data.

When the beginning time of receiving light is not within the vertical blanking period, the decision circuit 31 outputs the decision signal JG of low level, which is made a high level signal by an inverter G1, and selects an AND-gate G4 to output the charge sweeping-out pulse OFD, which is inputted through an OR-gate G5 into an AND-gate G6. The control pulse CNT outputted from the comparison and control circuit 23 and the charge sweeping-out pulse OFD are logically multiplied therein to generate the shutter pulse shown in FIG. 3(e).

Contrarily, when the beginning time of receiving light is within the vertical blanking period, the decision circuit 31 outputs the decision signal JG of high level, and selects the AND-gate G3 to output an inverted signal of the charge sweeping-out pulse OFD, which is inputted through the OR-gate G5 into the AND-gate G6. The control pulse CNT outputted from the comparison and control circuit 23 and the inverted signal of the charge sweeping-out pulse OFD are logically multiplied therein to generate the shutter pulse shown in FIG. 3(g).

Hence, a high capability of sweeping out the charges into the substrate is maintained by setting the high level period of the shutter pulse to cover the effective horizontal scanning period even when the light with a high intensity enters into the light receiving portion, and therefore the charges therein are prevented from overflowing.

Such control of the exposure period may be also carried out together with a mechanical shutter for the purpose of reducing a high intensity of light.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A driving method of solid state imager device having a first layer of a second conductivity type formed on a semiconductor substrate of a first conductivity type and a light receiving portion formed on a surface side of the first layer, which comprises controlling an exposure time by applying a predetermined voltage to the semiconductor substrate and sweeping out a signal charge accumulated in the light receiving portion into the semiconductor substrate, wherein, on the assumption that an effective exposure period is a period ranging from last application of the predetermined voltage to the semiconductor substrate to reading out the signal charge accumulated in the light receiving portion, an application period of the predetermined voltage to the semiconductor substrate exists only within a horizontal blanking period when the effective exposure period is beyond a vertical blanking period, and the application period of the predetermined voltage to the semiconductor substrate covers the entire effective horizontal scanning period in the vertical scanning period when the effective exposure period is within the vertical blanking period.

2. A solid state imager device having a first layer of a second conductivity type formed on a semiconductor substrate of a first conductivity type and a light receiving portion formed on a surface side of the first layer, comprising:

voltage application means for applying a predetermined voltage to the semiconductor substrate and sweeping out a signal charge accumulated in the light receiving portion to the semiconductor substrate;

checking means for checking whether an effective exposure period ranging from a last application of the predetermined voltage to the semiconductor substrate to reading out the signal charge accumulated in the light receiving portion exceeds a predetermined reference period; and pulse generation means for controlling the voltage application means by generating a pulse which exists only within a horizontal blanking period when the effective exposure period is beyond the predetermined reference period and which covers an entire effective horizontal scanning period in the vertical scanning period when the effective exposure period is within the predetermined reference period.

3. The solid state imager device as claimed in claim 2, wherein the predetermined reference period is within a vertical blanking period.

4. The solid state imager device as claimed in claim 2, wherein the checking means conducts counting in a unit of horizontal scanning period to measure the effective exposure period.

5. A solid slate imager device having a first layer of a second conductivity type formed on a semiconductor substrate of a first conductivity type and a light receiving portion formed on a surface side of the first layer, comprising:

voltage application means for applying a predetermined voltage to the semiconductor substrate and sweeping out a signal charge accumulated in the light receiving portion to the semiconductor substrate;

setting means for setting an effective exposure period ranging from a last application of the predetermined voltage to the semiconductor substrate to reading out the signal charge accumulated in the light receiving portion;

reference outputting means for outputting a reference value corresponding to a length of photometric period;

integrating means for integrating an electrical signal converted by the light receiving portion every horizontal scanning period;

upper level detecting means for detecting whether an output from the integrating means is beyond a predetermined upper limit;

lower level detecting means for detecting whether the output from the integrating means is below a predetermined lower limit;

counting means on an upper limit side for counting in a unit of horizontal scanning period a time length when the upper level detecting means is outputting a signal representing that the output from the integrating means is beyond the upper limit in the photometric period, and outputting a signal representing a too bright period on the basis of the count;

counting means on a lower limit side for counting in a unit of horizontal scanning period a time length when the lower level detecting means is outputting a signal representing that the output from the integrating means is below the lower limit in the photometric period, and outputting a signal representing a too dark period on the basis of the count;

level checking means for deciding every vertical scanning period whether to increase, decrease, or maintain the effective exposure period set in the setting means on the basis of a reference value output ted from the reference outputting means and respective signals from the counting means on the upper limit side and the counting means on the lower limit side;

decision means for deciding whether the effective exposure period set in the setting means exceeds a vertical blanking period; and pulse generation means for controlling the voltage application means by generating a pulse which is entirely within a horizontal blanking period when the effective exposure period is beyond the vertical blanking period and which covers an entire effective horizontal scanning period in the vertical scanning period when the effective exposure period is within the vertical blanking period.

* * * * *